United States Patent
Tanaka et al.

(10) Patent No.: US 7,164,864 B2
(45) Date of Patent: Jan. 16, 2007

(54) OPTICAL COMMUNICATIONS SYSTEM AND TRANSMISSION SECTION REPAIR METHOD

(75) Inventors: Toshiki Tanaka, Machida (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 09/783,527

(22) Filed: Feb. 15, 2001

(65) Prior Publication Data
US 2002/0041415 A1    Apr. 11, 2002

(30) Foreign Application Priority Data
Feb. 17, 2000   (JP)   .............................. 2000-040162

(51) Int. Cl.
*H04B 10/12*   (2006.01)
(52) U.S. Cl. .................. 398/148; 398/147; 398/178
(58) Field of Classification Search ................ 398/178, 398/148, 147; 348/241; 250/205; 702/104; 385/100, 123
See application file for complete search history.

(56) References Cited

U.S. PATENT DOCUMENTS

| 5,629,795 | A | * | 5/1997 | Suzuki et al. ................ 359/337 |
| 5,793,917 | A | * | 8/1998 | Yoshimura ................... 385/100 |
| 5,887,105 | A | * | 3/1999 | Bhagavatula et al. ........ 385/123 |
| 5,995,694 | A |   | 11/1999 | Akasaka et al. |

FOREIGN PATENT DOCUMENTS

| EP | 971 495 A2 | 1/2000 |
| JP | 7-087013   | 3/1995 |
| JP | 9-181705   | 7/1997 |
| JP | 11-084158  | 3/1999 |

OTHER PUBLICATIONS

Kazunori Mukasa et al., "Novel Network Fiber to Manage Dispersion at 1.55 μm with Combination of 1.3 μm Zero Dispersion Single Mode Fiber", ECOC 97, Sep. 22, 1997, pp. 127-130.
Masashi Onishi et al., "Optimization of Dispersion-Compensating Fibers Considering Self-Phase Modulation Suppression",, OFC '96 Technical Digest, pp. 200-201.
T. Kato et al., "Ultra-Low Nonlinearity Low-Loss Pure Silicacore Fibre for Long-Haul WDM Transmission", Electronics Letters, vol. 35, Sep. 16, 199, pp. 1615-1616.
M. Shirasaki et al., "Dispersion Compensation Using the Virtually Imaged Phased Array", OECC '99, pp. 1367-1370.
O. Leclerc and E. Desurvire, "Investigation into the robustness of 100Gbit/s (5+20Gbit/s) regenerated WDM soliton transoceanic transmission to line breaks and repairs", Aug. 28, 1997, vol. 33, No. 18, Electronics Letters.
Preliminary Search Report from Institut National de la Propriété Industrielle (France), dated Aug. 13, 2004.

* cited by examiner

*Primary Examiner*—David C. Payne
(74) *Attorney, Agent, or Firm*—Staas & Halsey LLP

(57) ABSTRACT

An optical communications system and transmission section repair method is provided to prevent the dispersion value in an optical receive station from being affected when a transmission line has been obstructed, wherein a patch is made into the transmission line adjusted for dispersion in the relay section of the transmission line. The transmission line includes positive dispersion fiber and negative dispersion fiber. The optical fiber used to patch the transmission line is an optical fiber where the absolute value of the dispersion is smaller than the dispersion value of the positive dispersion fiber or the negative dispersion fiber.

49 Claims, 17 Drawing Sheets

INSERTED CABLE
(SAME AS THE TRANSMISSION LINE)

PRIOR ART

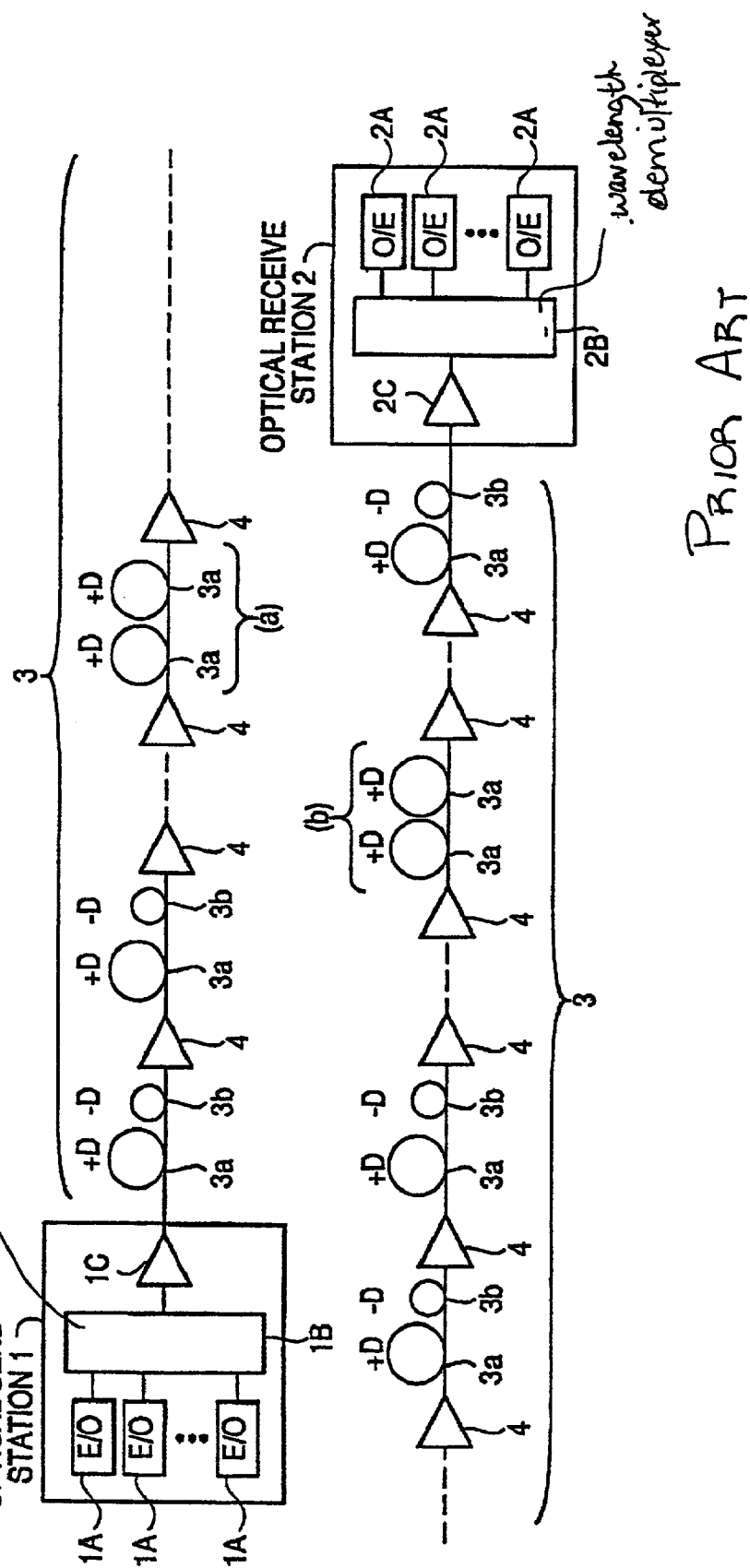

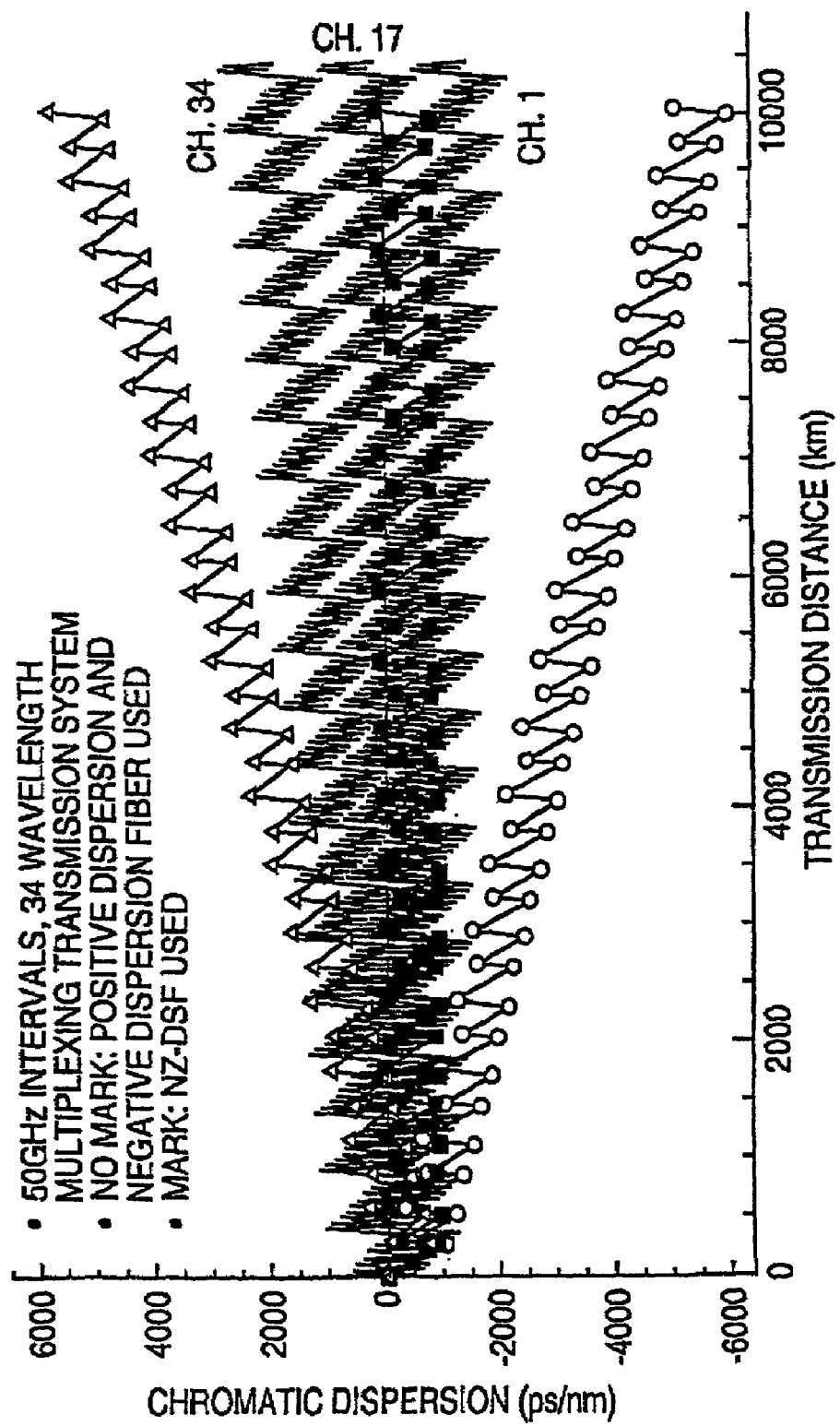

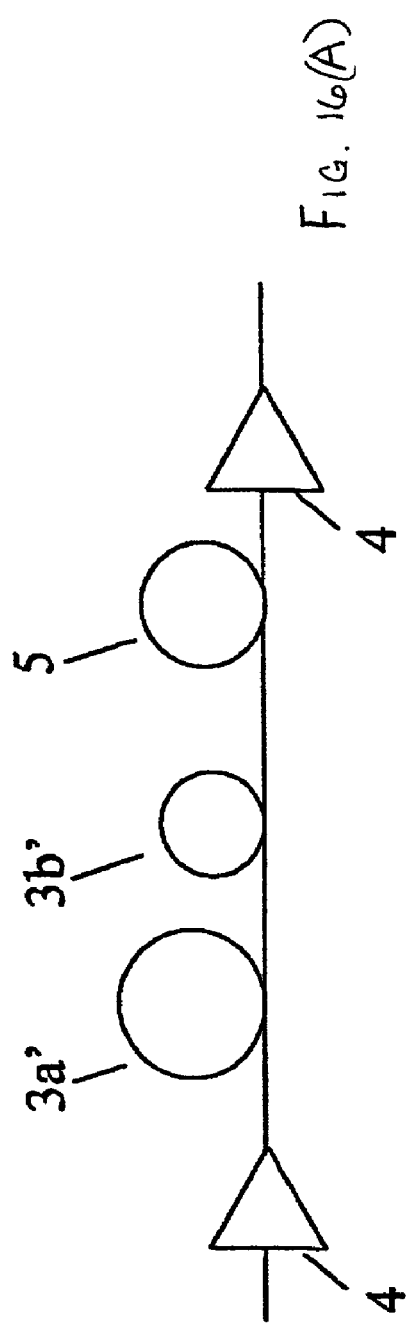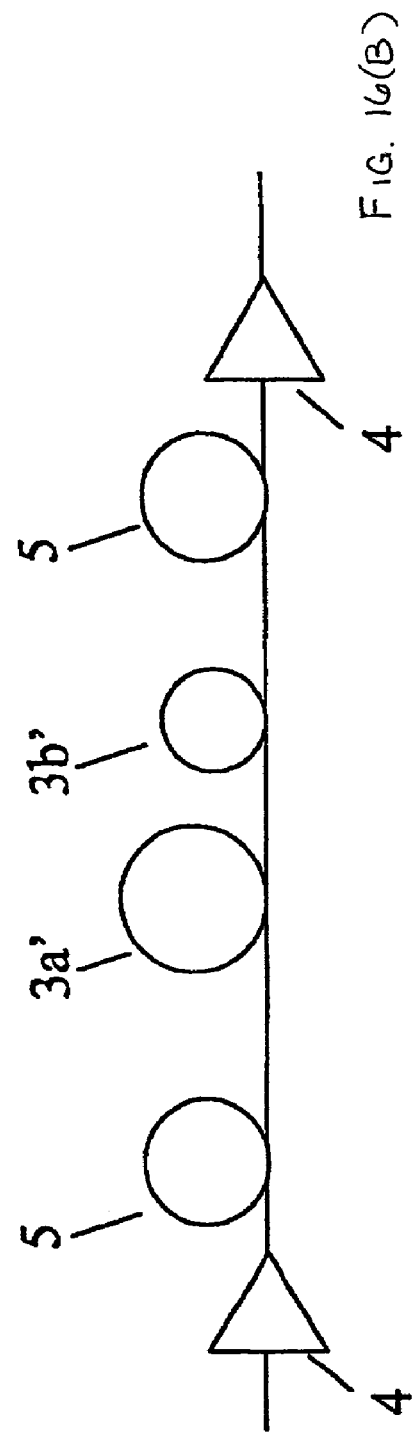

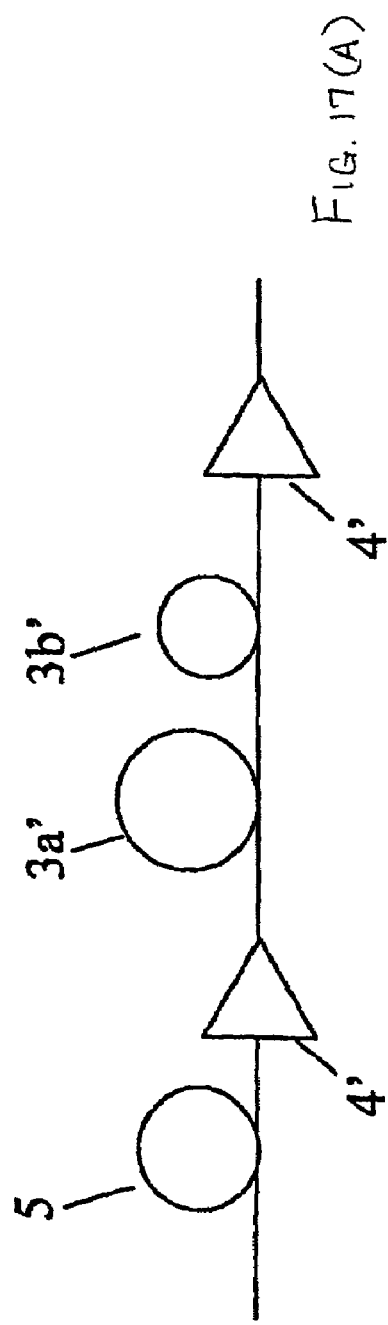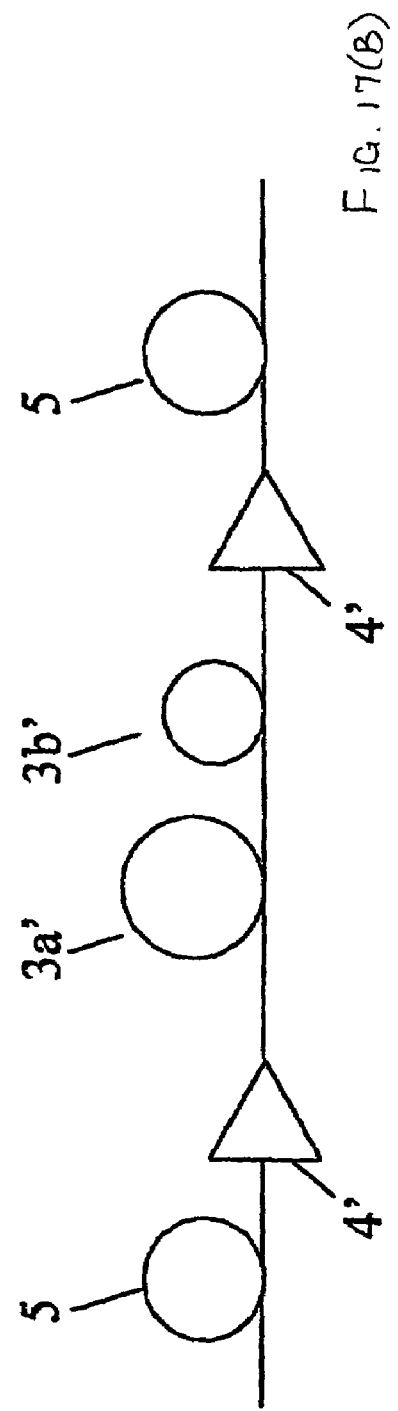

OPTICAL COMMUNICATIONS SYSTEM AND TRANSMISSION SECTION REPAIR METHOD

CROSS-REFERENCE TO RELATED APPLICATIONS

This application is based on, and claims priority to, Japanese application number 2000-040162, filed on Feb. 17, 2000, in Japan, and which is incorporated herein by reference.

BACKGROUND OF THE INVENTION

1. Field of the Invention

The present invention relates to an optical transmission line including positive and negative dispersion fibers, and repair of such a transmission line.

2. Description of the Related Art

FIG. 1 is a diagram illustrating a typical configuration of a wavelength division multiplexing optical amplification relay transmission system.

Referring now to FIG. 1, the WDM transmission optical system is typically made up of, for example, an optical send station (OS) 1, an optical receive station (OR) 2, optical fiber transmission lines 3 for connecting the sending and receiving stations, and several optical amplifiers 4 set up at the required intervals along the optical fiber transmission lines 3.

The optical send station 1 includes several optical transmitters (E/O) 1A for outputting many optical signals of differing wavelengths, a wavelength-multiplexer device 1B for multiplexing the many optical signals into a WDM signal light, and a post amp 1C for amplifying the WDM signal light from the wavelength multiplexer device 1B to the required level and outputting the WDM signal light to the optical transmission lines 3.

The optical fiber transmission lines 3 contain many relay divisions for connecting to optical send stations 1 and optical receive stations 2.

The optical amplifier 4, mounted in the transmission line, optically amplifies the WDM signal light and sends it to the optical receive station 2.

The optical receive station 2 includes a pre-amp 2C for amplifying to the WDM signal light of each of the wavelength bands transmitted by the optical fiber transmission line 3 to a required level, a wavelength demultiplexer 2B for dividing up the optical output from the pre-amp 2C into many optical signals according to the wavelength, and several optical receive stations (O/E) 2A for processing the many optical signals as they are received.

FIG. 2 is a diagram illustrating traditional transmission line repair.

Referring now to FIG. 2, an example of the transmission line repair when the optical fiber transmission line 3 in a relay section between two optical amplifiers 4 being cut off is shown. A transmission system of this type of configuration is used, for example, in an optical submarine cable system.

After removing the portion of the cable taking in water and connecting up both ends of the cut cable, a new optical submarine cable is inserted and is longer than the originally installed cable due to the connection being made on board a ship. The length of the new cable is determined by the depth of the water and must be at least twice the depth of water. The inserted cable is a fiber cable which is similar to the cable used as the optical fiber transmission line 3. There may be times when the many relay sections, created where the optical amplifiers split the cable between the optical send and the optical receive stations, use several different types of fiber. In this case, the inserted cable for repair in the transmission line uses a plurality of transmission lines having different dispersion values, respectively. The lengths of the transmission lines having the different dispersion values are adjusted and the overall dispersion value of the inserted cable is essentially zero. This allows for a reduction in misalignment caused by accumulated dispersion since the time the transmission system was originally installed.

Assume, for example, a non-zero dispersion shifted fiber (NZ-DSF) has a chromatic dispersion of −2 ps/nm/km and nine transmission sections are used. In addition, a 1.3 μm zero dispersion fiber (Single Mode Fiber (SMF)) has an optical dispersion of +18 ps/nm/km and one transmission section is used. The ratio of NZ-DSF and SMF would be adjusted to 9:1. In this way, cables having a dispersion value of essentially zero could be inserted which would allow for a reduction in the accumulated dispersion that accompany the inserted cables when the WDM optical transmission system is first installed.

Optical submarine cable systems are broken into the following three principal groups: shoreline, shallow ocean, and deep sea.

FIG. 3 is a diagram illustrating the types of sections of a submarine cable.

Referring now to FIG. 3, the shoreline section is the relay section that runs from the optical send station 1 to a first optical amplifier 4-1. Also, the shoreline section runs from a first optical amplifier 4-17 to the optical receive station 2. The shallow ocean section is the relay section in which optical amplifiers 4-2 through 4-6 are arranged in water up to approximately 1000 m deep. The deep sea section is the relay section is arranged from optical amplifiers 4-7 through 4-15 in water approximately 1000 m deep or deeper.

The frequency of repairs in each of the respective sections varies. Also, the deeper the water, the less frequent the repairs and a longer repair cable is needed.

Traditionally, the fiber used in shallow ocean, deep sea, and shoreline sections were of the same type. The submarine cable used in the respective sections were of different types of cables (i.e., the shoreline section of submarine cable was stronger than the shallow section of submarine cable, which was stronger than deep section of the submarine cable).

In a long distance, large capacity wavelength division multiplexing transmission system, the use of fiber having a large average mode field diameter and a small difference in accumulated chromatic dispersion between wavelengths is advantageous due to the reduced non-linear effect.

The transmission line uses a positive dispersion fiber (+D fiber) having a positive dispersion value in response to optical signal wavelengths transmitted over the first half of the relay section transmission line where the mode field diameter is large. Also, the transmission line uses a negative dispersion fiber (−D fiber) having a negative dispersion value in response to optical signal wavelengths where the chromatic dispersion and the chromatic dispersion slope from the first half of the fiber are compensated and the mode field diameter in the second half of the transmission line is small.

FIG. 4 is a diagram illustrating a typical configuration of a wavelength division multiplexing transmission system using positive dispersion and negative dispersion.

Referring now to FIG. 4, the WDM transmission optical system is made up of, for example, the optical send station (OS) 1, the optical receive station (OR) 2, the optical fiber transmission line 3 for connecting the optical sending and receiving stations, and several optical amplifiers 4 placed at the required intervals along the optical fiber transmission line 3.

The optical send station 1 and the optical receive station 2 are configured in the same way as in FIG. 1.

The optical fiber transmission line 3 contains several relay sections connecting the optical send station 1, each of the optical amplifiers 4, and the optical receive station 2. Each of the relay sections uses a hybrid transmission line configured as follows: The first half (sending side) uses the 1.3 μm zero dispersion SMF 3a, having a positive chromatic dispersion value and a positive dispersion slope, in the wavelength band of the WDM signal light. The second half uses the dispersion compensating fiber 3b having a negative chromatic dispersion value and a negative dispersion slope in the wavelength band of the WDM signal light.

In this example, the average chromatic dispersion in the sections of the hybrid transmission line made up of the positive dispersion fiber 3a and the negative dispersion fiber 3b, are set up as approximately −2 ps/nm/km. The accumulated chromatic dispersion is compensated by installing section (a) and (b) of FIG. 4 with only the positive dispersion fiber 3a.

FIG. 5 is a diagram illustrating a typical dispersion map of a wavelength division multiplexing transmission system.

Referring now to FIG. 5, the characteristics in the diagram are shown for the multiplexing of 34-wave optical signals with a optical signal channel interval of 50 GHz. In the diagram, NZ-DSF is used as the transmission line. A triangle represents channel 34, a black square represents channel 17, and a circle represents channel 1. Characteristics without a mark used the positive dispersion and negative dispersion fiber as the transmission line as in FIG. 4. Transmission lines that used positive dispersion and negative dispersion fiber had a smaller average dispersion slope. Thus, their accumulated dispersion following transmission was smaller and transmission waveform distortion was reduced.

The following problems are encountered when repairing optical lines with +D/−D fiber.

(1) Transmission Waveform Distortion Caused by Dispersion Management and the Accumulative Dispersion Amount.

Table 1 shows the chromatic dispersion values of the conventional transmission line NZ-DSF as well as those of positive dispersion fiber and negative dispersion fiber.

TABLE 1

Transmission Line Fiber Chromatic Dispersion Value

| Fiber | Positive Dispersion Fiber | Negative Dispersion Fiber | NZ DSF (Traditional) |
|---|---|---|---|
| Chromatic Dispersion Amount (ps/nm/km) | Approximately +20 | Approximately −20∼−90 | Approximately −2 |

The absolute value of the chromatic dispersion amount per unit of length of positive dispersion and negative dispersion fiber are both very significant and are more than the traditional transmission line NZ-DSF by a factor of 1. For this reason, when making transmission line repairs using transmission lines made up of systems like the traditional ones in transmission systems using positive dispersion and negative dispersion fiber, a great deal is lost in the dispersion management of such systems and the accumulative dispersion amount following transmission changes significantly. This causes a large increase in waveform distortion and the transmission characteristics degrade.

(2) Increases Connection Losses

Table 2 shows the mode field diameter of positive dispersion fiber, negative dispersion fiber, NZ-DSF, and SMF.

TABLE 2

Mode Field Diameter for Each Transmission Line Fiber

| Fiber | Positive Dispersion Fiber | Negative Dispersion Fiber | NZ-DSF | SMF |
|---|---|---|---|---|
| Mode Field Diameter ($\mu m^2$) | Approximately 10∼12 | Approximately 4∼6 | Approximately 7∼8 | Approximately 10∼12 |

The difference between the mode field diameters of the positive dispersion and negative dispersion fiber is larger than the differences between the mode field diameters of the SMF and NZ-DSF used in traditional transmission systems. Thus, the connection loss of the transmission line fiber is also larger. This effect becomes marked when the frequency of repairs is high or when the relay section is short.

(3) Excessive Increase in the Non-Linear Effect in the Negative Dispersion Fiber When reducing the chromatic dispersion effect using a combination of positive dispersion and negative dispersion fiber and when trouble occurs in the first half of the relay section, the effect of the non-linear effect that occurs in the negative dispersion fiber making up the inserted cable causes the waveform distortion to have a considerable effect on the transmission characteristics. Therefore, light power of sending signals are high power.

SUMMARY OF THE INVENTION

Accordingly, it is an object of the present invention to provide an optical communication system in which a transmission line is configured using positive dispersion fiber and negative dispersion fiber.

Objects of the present invention are achieved by providing a method for repairing a transmission line having a section which includes a first fiber having a positive dispersion with respect to wavelength transmitted through the section and a second fiber having a negative dispersion with respect to wavelength transmitted through the section. The method includes inserting a third fiber in the section, wherein the third fiber has an absolute value of dispersion per unit of length smaller than the absolute value of dispersion per unit of length of the first and second fibers.

Objects of the present invention are also achieved by providing an optical communication system which includes a method for repairing a transmission line having a section which includes a first fiber having a positive dispersion with respect to wavelength transmitted through the section and a second fiber having a negative dispersion with respect to wavelength transmitted through the section, a trouble occurring in the first fiber to thereby divide the first fiber into a first portion and a second portion. The method includes inserting a third fiber in the section between the first and second portions to repair the trouble, wherein the third fiber has an absolute value of dispersion smaller than the absolute value dispersion per unit of length of the first fiber and the second fiber.

Objects of the present invention are further achieved by providing an optical communication system which includes a method for repairing a transmission line having a section which includes a first fiber having a positive dispersion with respect to wavelength transmitted through the section and a second fiber having a negative dispersion with respect to wavelength transmitted through the section, a trouble occurring in the second fiber to thereby divide the second fiber into a first portion and a second portion. The method includes inserting a third fiber in the section between the first and second portions to repair the trouble, wherein the third fiber has an absolute value of dispersion per unit of length smaller than the absolute value of dispersion per unit of length of the first fiber and the second fiber.

Objects of the present invention are achieved by providing an optical communication system which includes a transmission line having first and second repeaters arranged along the transmission line with no other repeaters between the first and second repeaters and a section of the transmission line being defined as the portion of the transmission line between the first and second repeaters. The section includes a first fiber having a positive dispersion with respect to wavelength transmitted through the section and a second fiber having a negative dispersion with respect to wavelength transmitted through the section, wherein a third section inserted in the section to repair the section has an absolute value of dispersion per unit of length smaller than the absolute value of dispersion per unit of length of the first and the second fibers.

Objects of the present invention are achieved by providing an optical communication system which includes a transmission line having first and second ends and a plurality of sections between the first and second ends so that light travels from the first end, through each of the sections, and then to the second end. At least some sections of the plurality of sections each include a first fiber having a positive dispersion with respect to wavelength transmitted through the section and a second fiber having a negative dispersion with respect to wavelength transmitted through the section. A respective section of the plurality of sections, and not being a section of said at least some sections, being formed of an optical fiber having an absolute value of dispersion per unit of length smaller than the absolute value of dispersion per unit of length of the first and the second fibers. Said respective section having, arranged along the section, at least one of the group including: (a) a device for splitting light traveling through the section, (b) a device for inserting light into the section, (c) a gain equalizer, and (d) a dispersion compensator.

Objects of the present invention are achieved by providing an optical communication system which includes a section of a transmission line having repeaters arranged along the transmission line. The section includes a first fiber having a positive dispersion with respect to wavelength transmitted through the section and a second fiber having a negative dispersion with respect to wavelength transmitted through the section. At least one fiber other than the first and second fiber has an absolute value of dispersion per unit of length smaller than the absolute value of dispersion per unit of length of the first and second fibers.

Objects of the present invention are achieved by providing an optical communication system which includes a transmission line having a first section and a second section divided by repeaters arranged along the transmission line, wherein the first section includes a first fiber having a positive dispersion with respect to wavelength transmitted through the section and a second fiber having a negative dispersion with respect to wavelength transmitted through the section. The second section includes a fiber other than the first and second fiber. The fiber has an absolute value of dispersion per unit of length smaller than the absolute value of dispersion per unit of length of the first and second fibers.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4 (prior art) is a diagram illustrating a typical configuration of a wavelength division multiplexing transmission system using positive dispersion and negative dispersion.

FIG. 5 is a diagram illustrating a typical dispersion map of a wavelength division multiplexing transmission system.

FIGS. 16(A) and 16(B) are diagrams illustrating transmission line repair in a wavelength division multiplexing transmission system, according to an embodiment of the present invention.

FIGS. 17(A) and 17(B) are diagrams illustrating transmission line repair in a wavelength division multiplexing transmission system, according to an embodiment of the present invention.

DESCRIPTION OF THE PREFERRED EMBODIMENTS

Figure 1:
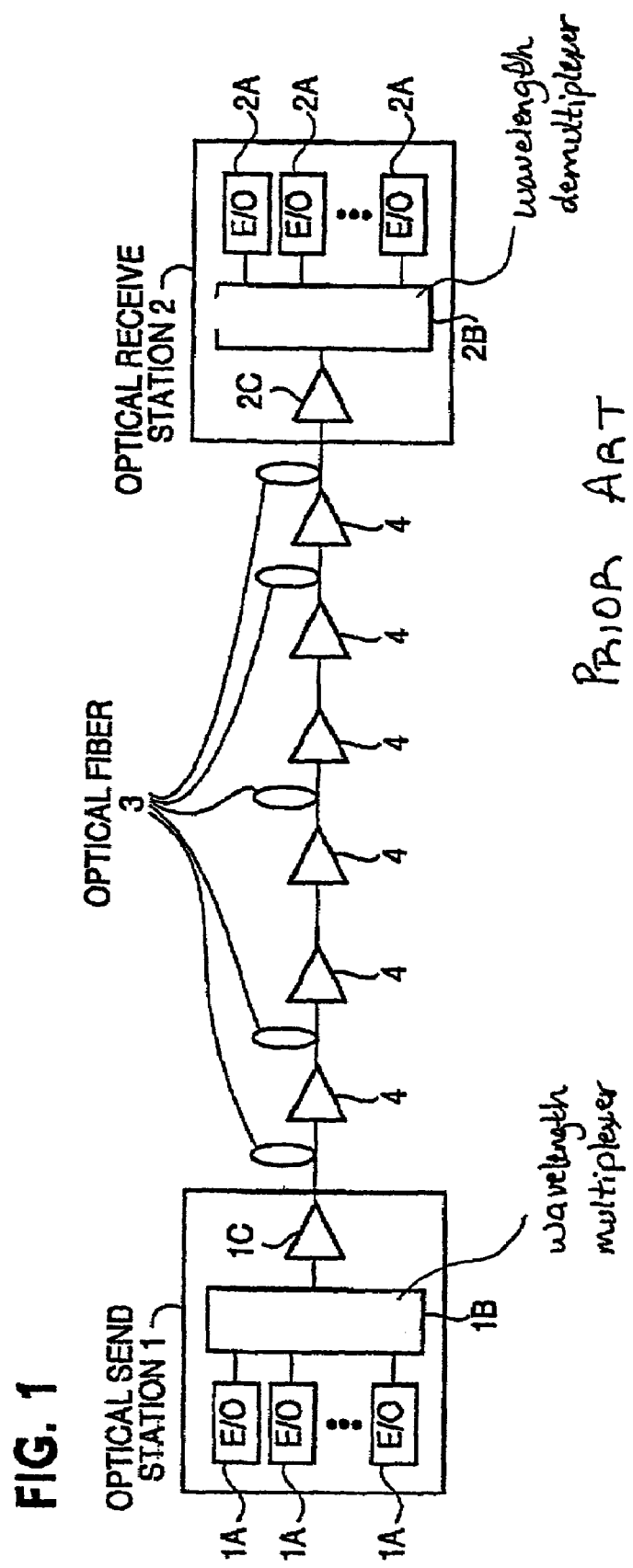
FIG. 1 (prior art) is a diagram illustrating a typical configuration of a wavelength division multiplexing transmission system.
Figure 2:
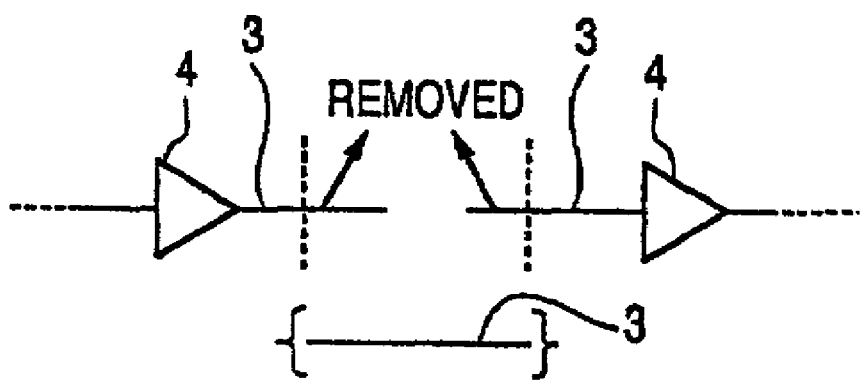
FIG. 2 (prior art) is a diagram illustrating traditional transmission line repair.
Figure 3:
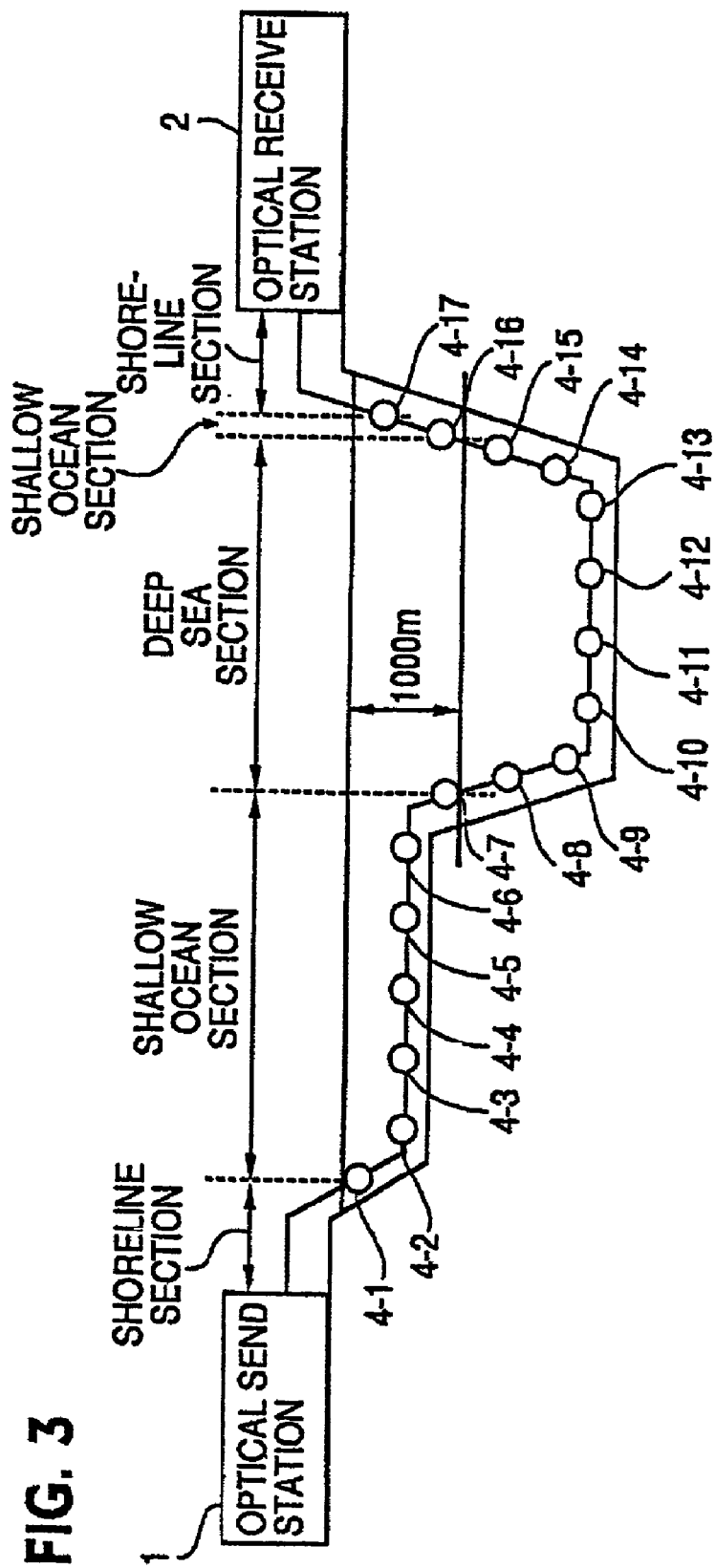
FIG. 3 (prior art) is a diagram illustrating the types of sections of a submarine cable.

Reference will now be made in detail to the present preferred embodiments of the present invention, examples of which are illustrated in the accompanying drawings, wherein like reference numerals to like elements throughout.

A wavelength division multiplexing transmission system uses a positive dispersion and a negative dispersion fiber in which a multiplexed optical wavelength is transmitted. The fiber used to repair the transmission line has a zero dispersion value on the short-wavelength side or the long-wavelength side adjoining the multiplexed optical signal band transmitted.

Figure 6A:
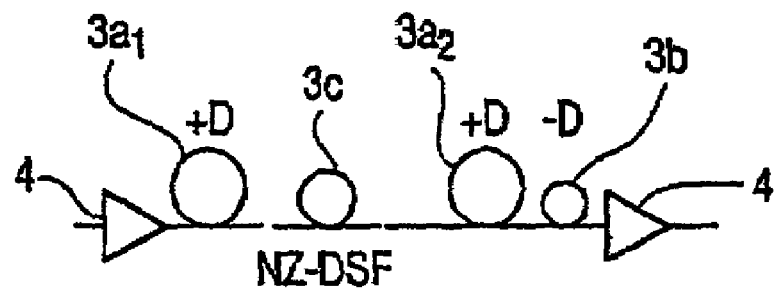
FIGS. 6(A), 6(B), and 6(C) are diagrams illustrating transmission line repair, according to an embodiment of the present invention.
Figure 6B:
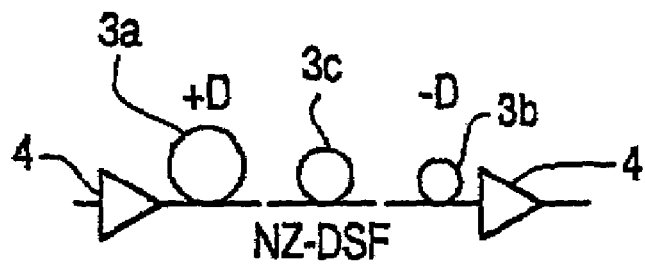
Figure 6C:
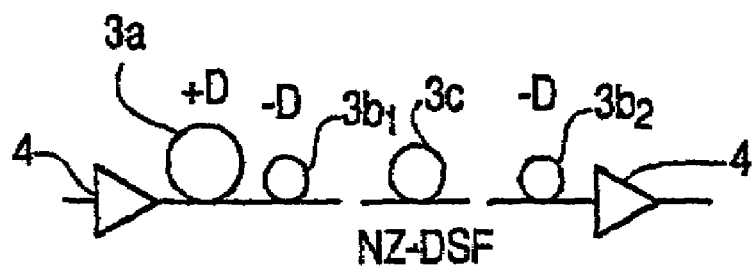

FIGS. 6(A), 6(B), and 6(C) are diagrams illustrating transmission line repair, according to an embodiment of the present invention. FIGS. 6(A), 6(B), and 6(C) show, for example, a relay section where NZ-DSF is a transmission line with a smaller dispersion absolute value than the positive dispersion fiber and the negative dispersion fiber. Here, the optical signal wavelength is transmitted by the multi-channel (i.e. 32-channel) optical signal station 1 between 1.530 µm and 1.610 µm. The optical fiber 3 making up the transmission line have the dispersion values, for example, as shown in Table 1 above, that relate to the optical signal wavelength transmitted by the optical send station 1.

Referring now to FIG. 6(A), a diagram illustrating a trouble in the positive dispersion fiber in the front section of a relay section made up of positive dispersion fiber and negative dispersion fiber is shown. A "trouble" is defined, for example, as a break in the transmission line, or any other problem which blocks light from being transmitted through the transmission lines and thereby requires a portion of the transmission line to be repaired or replaced.

Here, for example, the positive dispersion fiber $3a$ (as shown in FIG. 4) in the front section of the relay section is split into a positive dispersion fiber $3a_1$ and a positive dispersion fiber $3a_2$.

The WDM signal light is amplified to the required level in the optical amplifier 4 and, after traveling through the positive dispersion fiber $3a_1$, passes through NZ-DSF $3c$ which is inserted because of the repair.

Afterwards, the WDM signal light is transmitted across the positive dispersion fiber $3a_2$ and the negative dispersion fiber $3b$, and enters the next optical amplifier 4.

Referring now to FIG. 6(B), a diagram illustrating a trouble in the vicinity of the positive dispersion fiber $3a$ and negative dispersion fiber $3b$ of a relay section of the hybrid transmission line is shown. The relay section is composed of the positive dispersion fiber $3a$ and the negative dispersion fiber $3b$.

The WDM signal light is amplified to the required level in the optical amplifier 4 and, after traveling through the positive dispersion fiber $3a$, it passes through NZ-DSF $3c$ inserted because of the repair.

Afterwards, the WDM signal light is transmitted through the negative dispersion fiber $3b$ and enters another optical amplifier 4.

Referring now to FIG. 6(C), a diagram illustrating a trouble in the negative dispersion fiber of a relay section made up of the positive dispersion fiber and the negative dispersion fiber is shown. Here, for example, the negative dispersion fiber $3b$ (as shown in FIG. 4) of the relay section is split into a negative dispersion fiber $3b_1$ and a negative dispersion fiber $3b_2$.

The WDM signal light is amplified to the required level in the optical amplifier 4 and, after traveling through the positive dispersion fiber $3a$, it passes through the negative dispersion fiber $3b_1$ at the front section of the negative dispersion fiber $3b$.

Afterwards, the WDM signal light is transmitted through NZ-DSF $3c$ which is inserted for the repair, and then travels through the negative dispersion fiber $3b_2$ at the back section of the negative dispersion fiber $3b$, and then enters another optical amplifier 4.

When repairing the transmission line, the conditions in FIGS. 6(A), (B) and (C) must be considered. However, the use of the invention shown in any of one of FIGS. 6(A), (B), and (C) brings about the effects described in (A), (B), and (C) below:

(A) Because the absolute value of the chromatic dispersion amount per unit of length of NZ-DSF $3c$ is small (−2 ps/nm/km), the dispersion management is affected minimally. Also, because of minimum change in the accumulated dispersion amount, the effect on the transmission characteristics could be reduced.

(B) The mode field diameter of NZ-DSF $3c$ is in the space between the positive dispersion fibers $3a$, $3a_1$ and $3a_2$ and the negative dispersion fibers $3b$, $3b_1$ and $3b_2$.

Therefore, no matter which fiber is connected between the hybrid transmission line made up of positive dispersion fiber $3a$ and negative dispersion fiber $3b$, the connection loss will not be excessively large and could be configured so that it is nearly the same. There is also little excessive degradation due to the type of non-linear effect that occurs when using the negative dispersion fiber $3b$ in the front section of the hybrid transmission line.

(C) Because the spare fiber (NZ-DSF $3c$) can be limited to a single type, there is no need to consider the directionality when preparing cables for repairs of leading lines or trailing lines, which will improve working efficiency.

In this embodiment, the long wavelength or short wavelength sides adjoining the wavelength band of the optical signal wavelength transmitted, have zero dispersion values. Thus, NZ-DSF $3c$, which has a smaller absolute value for the dispersion amount per unit of length in relation to the optical signal wavelength transmitted than the positive dispersion fiber $3a$ or the negative dispersion fiber $3b$, is used.

As an example, dispersion shift fiber (DSF) or a similar fiber could be used where the transmitted signal wavelength and the zero dispersion wavelength match.

In considering the non-linear effect between the DSF transmission signal light wavelengths, it is possible that the use of NZ-DSF $3c$ would yield superior transmission characteristics.

Figure 7:
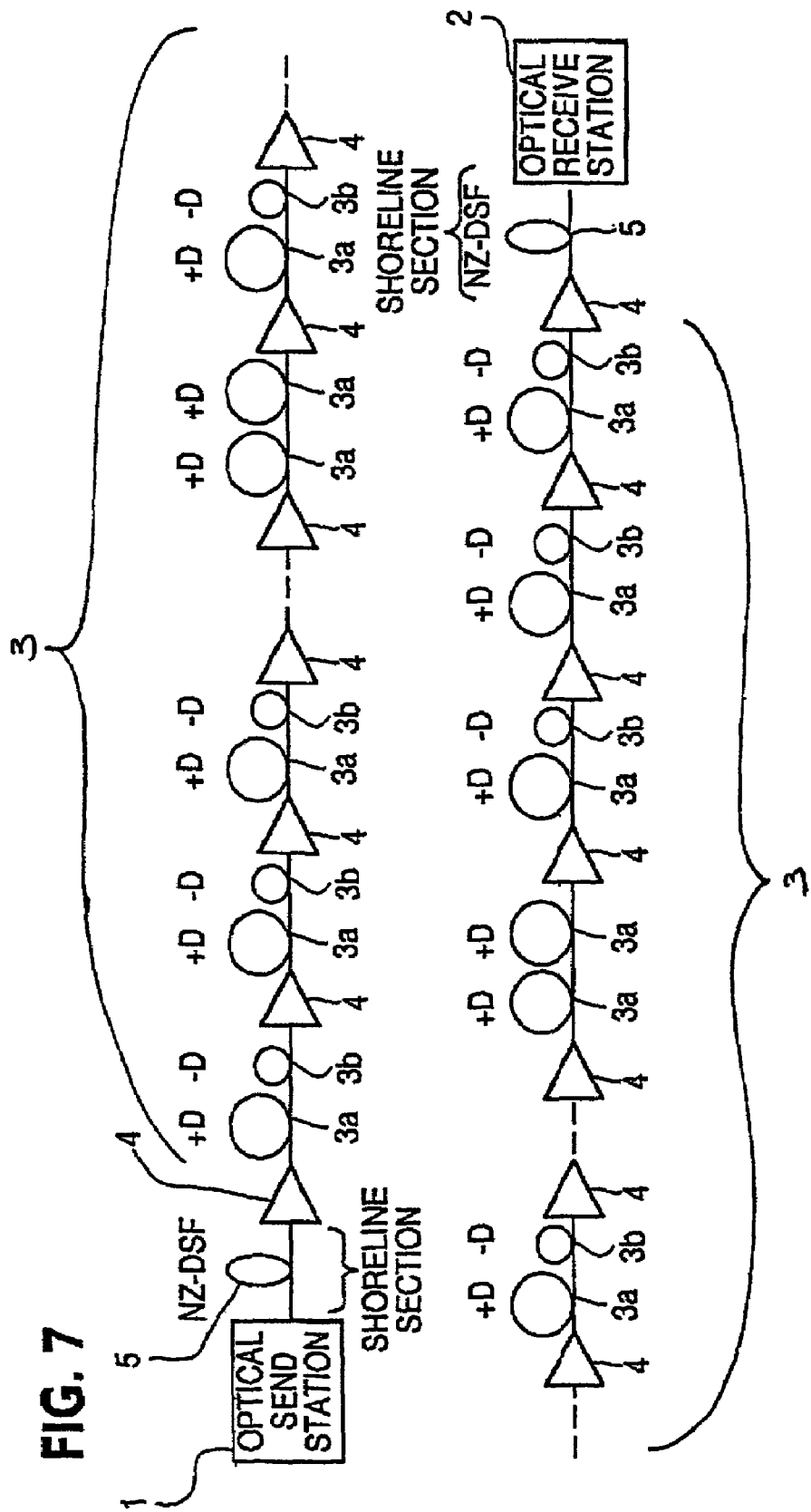
FIG. 7 is a diagram illustrating of a wavelength division multiplexing transmission system, according to an embodiment of the present invention.

FIG. 7 is a diagram illustrating of a wavelength division multiplexing transmission system, according to an embodiment of the present invention.

Referring now to FIG. 7, the WDM transmission optical system is made up of the optical send station (OS) 1, the optical receive station (OR) 2, an optical fiber transmission line 5 for connecting the optical amplifier 4 connected to the shoreline section to the optical send station 1 and the optical receive station 2, the optical fiber transmission lines 3, and the optical amplifiers 4 arranged at the required intervals along the optical fiber transmission lines 3.

The configuration of the optical send station 1 and the optical receive station 2 is the same as the configuration shown in FIG. 1. Here, the optical signal wavelength sent over the optical send station 1 is sent, for example, by multiple channels (i.e. 32-channels) between 1.530 μm and 1.610 μm from optical send station 1.

NZ-DSF is used in the relay section from the optical send station 1 to the first optical amplifier 4 and in the relay section from the last optical amplifier 4 to the optical receive station 2. A 1.3 μm zero dispersion SMF 3a having a positive chromatic dispersion value and positive dispersion slope could, for example, be used in the front section of the relay section and a dispersion compensation fiber 3b having a negative chromatic dispersion value and a negative dispersion slope could, for example, be used in the back section to make a hybrid transmission line. The dispersion of the hybrid transmission line could be offset using transmission lines having only 1.3 μm zero dispersion SMF 3a.

The WDM signal light sent from the optical send station 1 is transmitted through NZ-DSF (optical transmission line 5). Then, the WDM signal light is transmitted over several hybrid transmission lines made of 1.3 μm zero dispersion SMF 3a and dispersion compensation fibers 3b and transmission lines having only 1.3 μm zero dispersion SMF 3a for offsetting the dispersion of those hybrid transmission lines.

Afterwards, the WDM signal light is transmitted through the NZ-DSF (optical transmission line 5), and enters the receive station 2.

The hybrid transmission line made up of the 1.3 μm zero dispersion SMF 3a and the dispersion compensation fiber 3b demonstrated excellent long distance transmission characteristics when compared with those of the NZ-DSF. However, since fibers with two types of mode field diameters having widely divergent chromatic dispersion per unit of length are used, the effect of the dispersion management or the section loss on the transmission system is significant when there is a trouble and fiber is removed or inserted. As a result, the degradation of the transmission characteristics becomes larger than the degradation of the NZ-DSF.

NZ-DSF (optical transmission line 5) having a smaller chromatic dispersion value per unit of length is used in the relay sections from the optical send station 1 to the first optical amplifier 4 where the possibility of a trouble is high, and in the relay sections between the last optical amplifier 4 and optical receive station 2.

When there is a trouble and fiber is removed or inserted, NZ-DSF (optical transmission line 5) has an absolute value for the chromatic dispersion amount per unit of length that is small such that the dispersion management will not be significantly affected. Also, since there will be little change in the accumulated dispersion amount, the effect on the transmission characteristics can be reduced.

To prevent excessive connection loss when making repairs, the optical transmission line 5 does not use hybrid transmission line multiple types of fibers. Here, the fibers shown in Table 1 above, could, for example, be used for the positive dispersion fiber 3a, negative dispersion fiber 3b and NZ-DSF.

Also, as in the embodiment described in FIG. 6, as long as the fiber is an optical fiber with an absolute value for the dispersion amount per unit of length, in relation to the optical signal wavelength, smaller than that of the positive dispersion fiber 3a or the negative dispersion fiber 3b, it may be used in the first section and last section instead of NZ-DSF 3c.

The configuration of FIG. 7 may use the same configuration of FIG. 6 when a trouble occurs.

Figure 8:
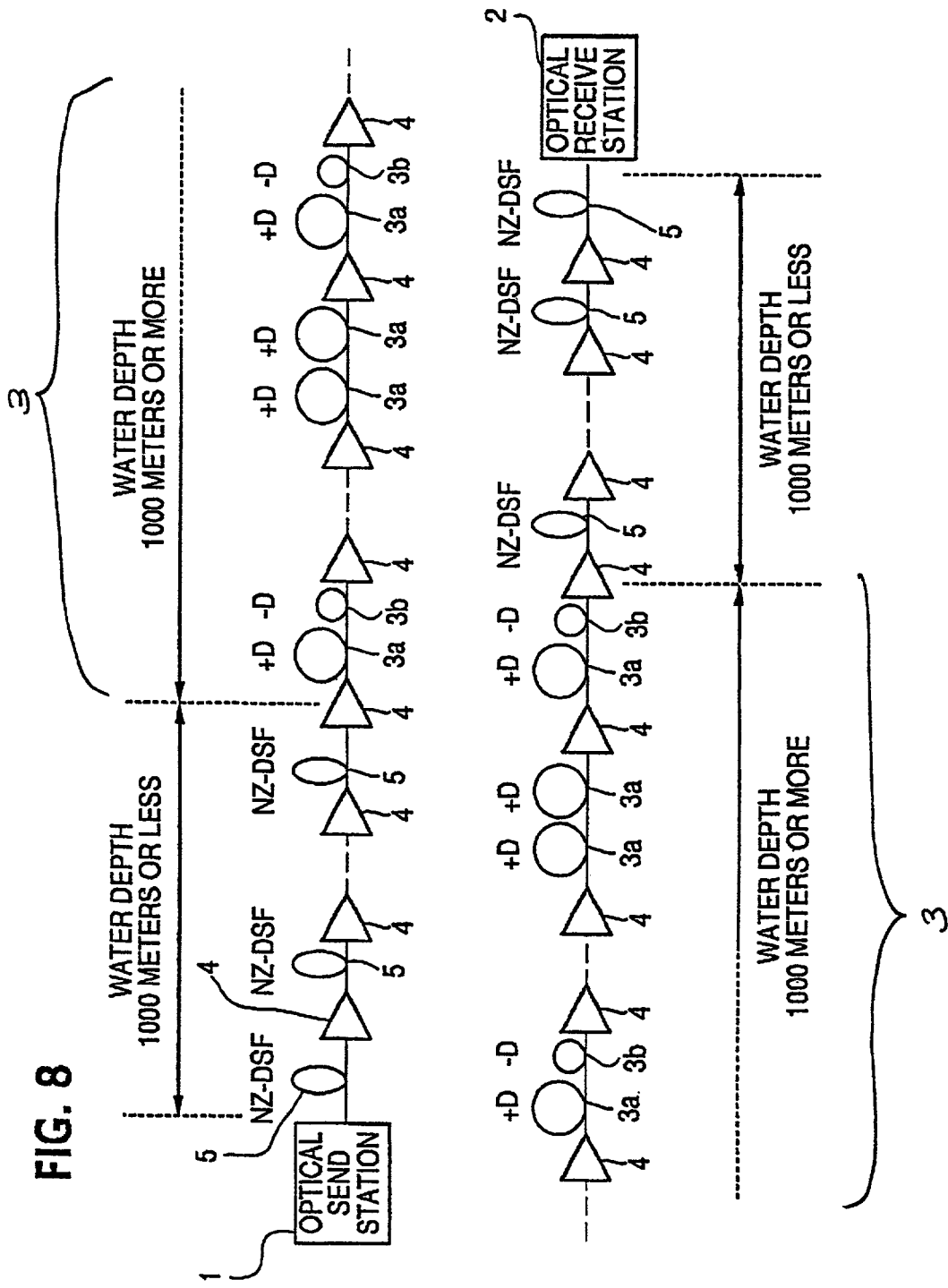
FIG. 8 is a diagram illustrating of a wavelength division multiplexing transmission system, according to an embodiment of the present invention.

FIG. 8 is a diagram illustrating of a wavelength division multiplexing transmission system, according to an embodiment of the present invention.

Referring now to FIG. 8, the WDM transmission optical system includes the optical send station (OS) 1, the optical receive station (OR) 2, the optical transmission line 5 connecting to the optical send station 1 and the optical receive station 2, the optical amplifiers 4 placed in water at depths of 1000 meters or less, and the optical transmission line 3 connecting the optical amplifiers 4 placed in water at depths of 1000 meters or more at the required intervals.

The NZ-DSF is used in the sections of the optical transmission line 5 placed in the water at depths of 1000 meters or less. In the sections placed in depths of water 1000 meters or more, a 1.3 μm zero dispersion SMF 3a having a positive chromatic dispersion value and a positive display slope could, for example, be used in the first half and a display compensating fiber 3b having a negative display slope and a negative chromatic dispersion value could, for example, be used in the second half to make a hybrid transmission. The dispersion of the hybrid transmission line could also be offset by the 1.3 μm zero dispersion SMF 3a.

The optical signal sent from the optical send station 1 is transmitted through the NZ-DSF (optical transmission line 5), in the many relay sections where the optical amplifier 4 is placed in the water at depths of 1000 meters or less.

In the relay sections having optical amplifier 4 placed in the water at depths of 1000 meters or more, the optical signal is transmitted over several hybrid transmission lines made of 1.3 μm zero dispersion SMF 3a, the dispersion compensation fiber 3b, and the transmission lines having only 1.3 μm zero dispersion SMF 3a that offsets the dispersion of those hybrid transmission lines.

Afterwards, in the several relay sections containing optical amplifiers 4 arranged in the water at depths of 1000 meters or less, the optical signal is transmitted over the NZ-DSF (optical transmission line 5), and enters the receive side.

The transmission characteristics of the hybrid transmission line made of the 1.3 μm zero dispersion SMF 3a and the dispersion compensation fiber 3b were excellent compared to those of the NZ-DSF.

However, since fibers were used that have two types of mode field diameters having very different chromatic dispersions per unit of length, there is a considerable effect on the transmission system pertaining to dispersion management and section loss when there is a trouble and fiber is either removed or installed. As a result, the degradation of the transmission characteristics is greater than the degradation of the NZ-DSF.

For these reasons, in relay sections having optical amplifiers 4 arranged in water at depths of 1000 meters or less and the possibility of a trouble is high, NZ-DSF (optical transmission line 5) which has a small chromatic dispersion value per unit of length is used.

NZ-DSF (optical transmission line 5) has a small absolute value for the wavelength dispersion amount per unit of length. As a result, when there is a trouble and fiber is removed or inserted, the effect on the dispersion management is bad and the change in the accumulated dispersion amount is small. Thus, the effect on the transmission characteristics can be kept small.

Also, to prevent excessive connection loss when making repairs, the optical transmission line 5 does not use multiple types of fiber. Here, the fibers shown in Table 1 could, for example, be used for the positive dispersion fiber 3a, negative dispersion fiber 3b, and NZ-DSF.

Also, as in the embodiment described in FIG. 6, as long as an optical fiber for which the absolute value of the amount of dispersion per unit of length, in relation to the transmitted optical signal wavelength, is smaller than that of the positive dispersion fiber 3a or the negative dispersion fiber 3b, it could be used instead of NZ-DSF 3c in sections of water at depths of 1000 meters or less.

The configuration of FIG. 8 may use the same configuration of FIG. 6 when a trouble occurs.

In FIG. 8, the transmission section is in water at a depth of 1000 m or less, but only exists in the optical send station 1 and the optical receive station 2. If there are transmission sections that are in water at depths of 1000 meters or less in the central sections between terminal stations, an optical fiber for which the absolute value of the dispersion amount per unit of length, in relation to the optical signal wavelength transmitted, is smaller than that of the positive dispersion fiber 3a or the negative dispersion fiber 3b may be used.

Figure 9:
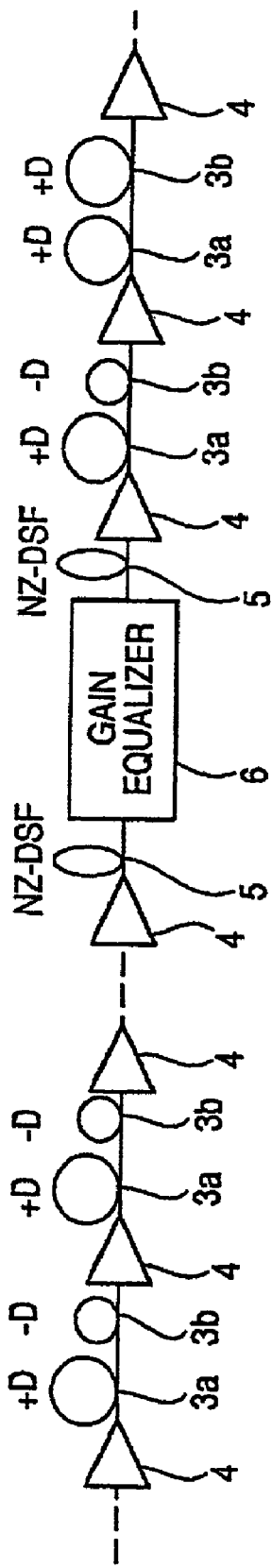
FIG. 9 is a diagram illustrating of a wavelength division multiplexing transmission system, according to an embodiment of the present invention.
Figure 10:
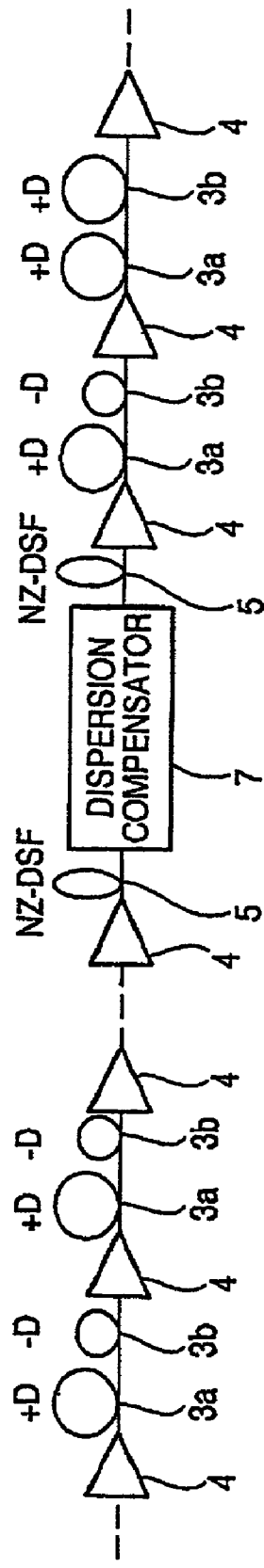
FIG. 10 is a diagram illustrating of a wavelength division multiplexing transmission system, according to an embodiment of the present invention.
Figure 11:
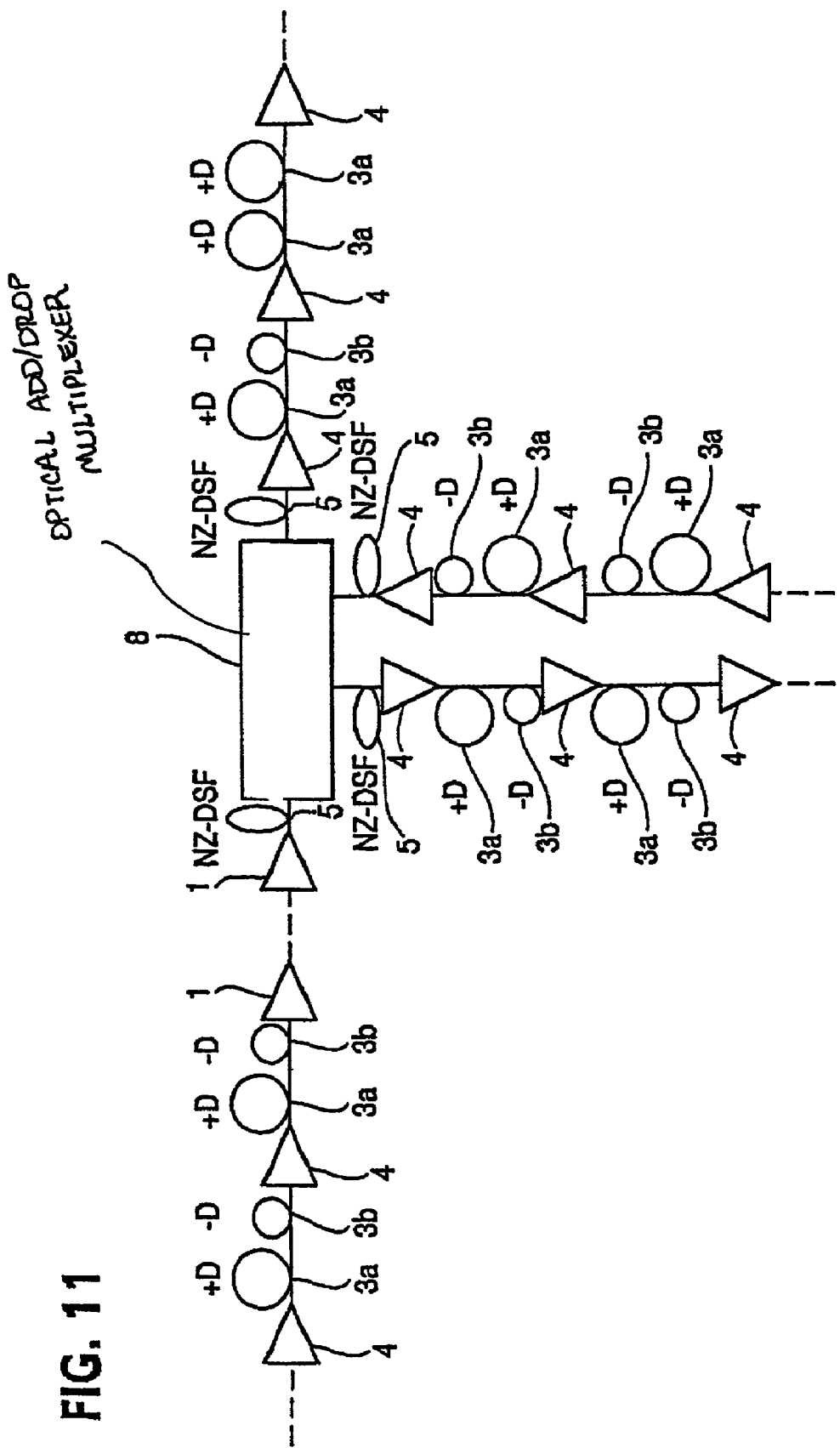
FIG. 11 is a diagram illustrating of a wavelength division multiplexing transmission system, according to an embodiment of the present invention.
Figure 12A:
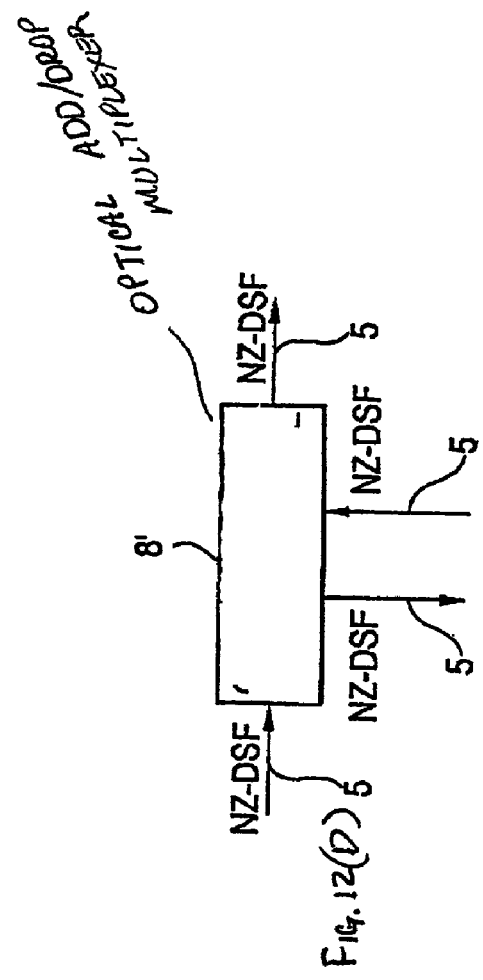
FIGS. 12(A), 12(B), 12(C), and 12(D) are diagrams illustrating a configuration of devices, according to an embodiment of the present invention.
Figure 12B:
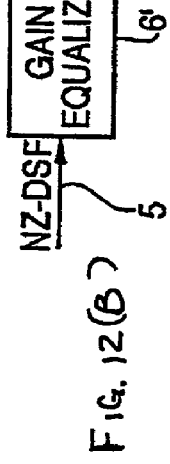
Figure 12C:
Figure 12D:
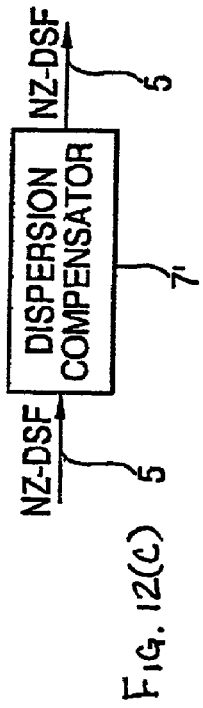

FIGS. 9, 10, and 11 are diagrams illustrating of a wavelength division multiplexing transmission system, according to an embodiment of the present invention.

FIG. 9 shows a gain equalizer 6 which equalizes the gain of the optical amplifier 4. FIG. 10 shows a dispersion compensator 7 for offsetting the chromatic dispersion. FIG. 11 shows an optical add/drop multiplexer 8 for dividing signal light from the main line and inserting signal light into the main line and in particular, the vicinity of the section including those devices.

The WDM signal light is amplified by the optical amplifiers 4 at specific intervals. It is then transmitted through several hybrid transmission lines made of the 1.3 μm zero dispersion SMF 3a and the dispersion compensating fiber 3b. The WDM signal light passes between the relay sections including either the gain equalizer 6, the dispersion compensator 7, or the optical add/drop multiplexer 8. Afterwards, the WDM signal light is transmitted once again through several hybrid transmission lines made of the 1.3 μm zero dispersion SMF 3a and the dispersion compensating fiber 3b.

NZ-DSF (optical transmission line 5) is mounted onto both ends of the optical transmission line connecting to the optical amplifier 4 in the relay section including the gain equalizer 6, the dispersion compensator 7, or the optical add/drop multiplexer 8. Each of the devices are mounted in the center. Because the devices generate losses, the length of the optical fiber in the sections including them are shortened.

When using a hybrid transmission line made of a 1.3 μm zero dispersion SMF 3a and a dispersion compensation fiber 3b in the section including the gain equalizer 6, the dispersion compensator 7, or the optical add/drop multiplexer 8, the following occurs: If the length of the section is reduced, the effect of the transmission characteristics of the hybrid transmission line will be decreased and the benefits of using a hybrid transmission line including a 1.3 μm zero dispersion SMF 3a and a dispersion compensation fiber 3b are negligible.

Other disadvantages involve the need to control the average dispersion by adjusting the length ratio of the hybrid transmission line, and the misalignment or excessive connection loss from the dispersion management when repairing the transmission lines.

Therefore, by using NZ-DSF (optical transmission line 5) as the fiber used in the sections including the gain equalizer 6, the dispersion compensator 7, or the optical add/drop multiplexer 8, it is possible to control the excessive degradation of the transmission characteristics when repairing the transmission line. Here, the fibers shown in Table 1 could, for example, be used for the positive dispersion fiber 3a, negative dispersion fiber 3b, and NZ-DSF.

Also, as in the embodiment described in FIG. 6, as long as the optical fiber for which the absolute value of the amount of dispersion per unit of length, in relation to the transmitted optical signal wavelength, is smaller than that of the positive dispersion fiber 3a or the negative dispersion fiber 3b, it may be used in place of NZ-DSF 3c.

FIGS. 12(A), 12(B), 12(C), and 12(D) are diagrams illustrating a configuration of devices, according to an embodiment of the present invention.

Referring now to FIGS. 12(A)–(D), examples of NZ-DSF (optical transmission line 5) are shown where NZ-DSF is used as the fiber of the input/output section of an embodiment including (A) a spare optical amplifier 4', (B) a gain equalizer 6', (C) a dispersion compensator 7' and (D) an optical add/drop multiplexer 8'.

Because the absolute value of the chromatic dispersion amount per unit of length for the optical transmission line 5 is used, the dispersion management will not be greatly diminished and the change in the accumulated dispersion amount will remain small such that the effect on the transmission characteristics can be kept low.

The mode field diameter of the optical transmission line 5 is between the positive dispersion fiber 3a and the negative dispersion fiber 3b. For this reason, no fiber that is between the hybrid transmission line section including the positive dispersion fiber 3a and the negative dispersion fiber 3b would have excessive connection loss. Thus, there is little excessive connection losses when using NZ-DSF (optical transmission line 5) on both ends of a section including a gain equalizer 6, dispersion compensator 7, or an optical add/drop multiplexer 8 like those shown FIGS. 9, 10, and 11.

Furthermore, in order to reduce the degradation of transmission characteristics caused by chromatic dispersion, it is effective to a) insert into the optical send station 1 or optical receive station 2, a blanket chromatic dispersion compensator that is either fixed or variable and b) insert a variable dispersion compensator 9 into the transmission section. Here, the fiber in Table 1 may be used for the NZ-DSF.

Also, as in the embodiment described in FIG. 6, as long as an optical fiber for which the absolute value of the amount of dispersion per unit of length, in relation to the transmitted optical signal wavelength, is smaller than that of the positive dispersion fiber 3a or the negative dispersion fiber 3b, it may be used in place of NZ-DSF 3c.

Figure 13:
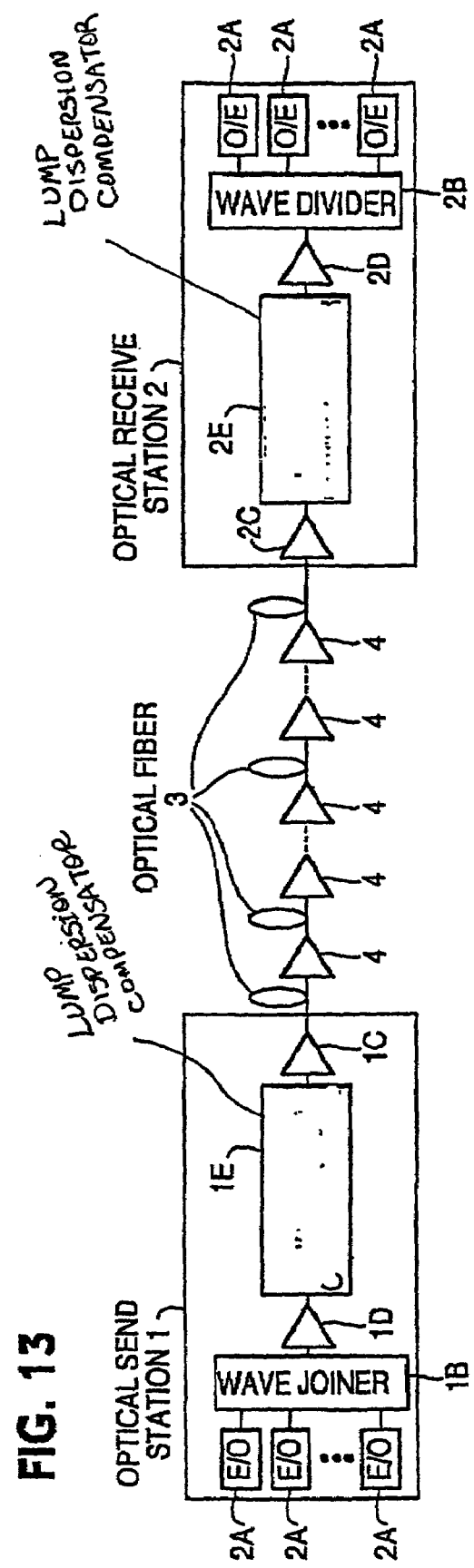
FIG. 13 is a diagram illustrating a configuration of a wavelength division multiplexing transmission system where a lumped dispersion compensator has been installed in the send station and the receive station, according to an embodiment of the present invention.

FIG. 13 is a diagram illustrating a configuration of a wavelength division multiplexing transmission system where a lumped dispersion compensator has been installed in the send station and the receive station, according to an embodiment of the present invention.

The wavelength division multiplexing transmission system in FIG. 13 can include, for example, an optical send station (OS) 1, optical receive station (OR) 2, an optical fiber transmission line 3 connected between the optical send station 1 and optical receive station 2, and several optical amplifiers 4 arranged at the required intervals along the optical fiber transmission line 3.

The optical send station 1 has many optical send devices (E/O) 1A for outputting the respective optical signals of different wavelengths, the wavelength multiplexer device 1B for multiplexing the wavelengths of the optical signals, and the optical amplifiers 1D for amplifying the WDM signal from the wavelength multiplexer device 1B to a specific level and outputting the signal to a lumped dispersion compensator 1E. The lumped dispersion compensator 1E offsets in advance, the accumulated chromatic dispersion generated in the transmission lines for all wavelengths in a bundle. The optical send station 1 also includes a post amp 1C that amplifies to the required level, the WDM signal light from the lumped dispersion compensator 1E and outputs the WDM signal light to the optical fiber transmission line The optical receive station 2 has a pre-amp 2C that amplifies the WDM signal light from the wavelength bands transmitted through the optical transmission lines 3 to the required level, a lumped dispersion compensator 2E that offsets in a bundle, the accumulated chromatic dispersion generated in the transmission lines for all wavelengths of the WDM signal light output from the pre-amp 2C, and the optical amplifier 2D that amplifies to a specific level, the output from the lumped dispersion compensator 2E. The optical receive station 2 has the wavelength demultiplexer 2B that divides the WDM signal light output from the optical amplifier 2D and divides it into many optical signals according to wavelength. Also, the optical receive station 2 has several optical receivers (O/E) 2A for performing the respective receive processes on the many optical signals.

When misalignment of the accumulated chromatic dispersion occurs during the repairing of the transmission lines, the accumulated dispersion misalignment can be reduced by changing the chromatic dispersion compensation amount of the lumped dispersion compensators 1E and 2E in the optical send station 1 and the optical receive station 2, respectively, for the purpose of offsetting the chromatic dispersion misalignment that occurs. This makes it possible to control degradation of the transmission characteristics.

Figure 14:
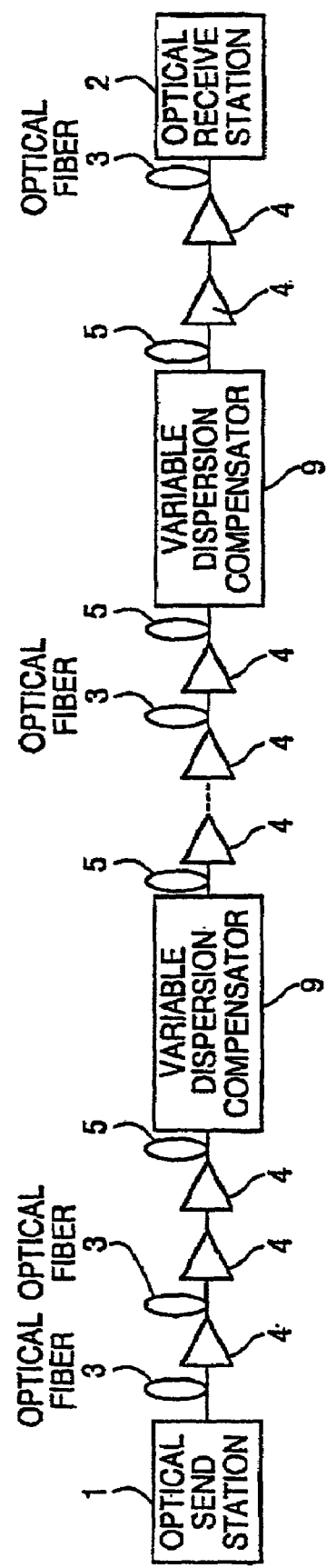
FIG. 14 is a diagram illustrating a configuration of a wavelength division multiplexing transmission system where a variable dispersion compensator has been installed in the transmission section, according to an embodiment of the present invention.

FIG. 14 is a diagram illustrating a configuration of a wavelength division multiplexing transmission system where a variable dispersion compensator has been installed in the transmission section, according to an embodiment of the present invention.

The WDM transmission optical system in FIG. 14 can include, for example, the optical send station (OS) 1, the optical receive station (OR) 2, and the optical fiber transmission line 3 connecting the optical send station 1 and optical receive station 2. Also, it could contain many optical amplifiers 4 arranged at specific intervals along the optical fiber transmission lines 3, a variable dispersion compensator 9, and an optical transmission line 5 used in the section into which the variable dispersion compensator 1 has been inserted.

The configuration of the optical send station 1 and the optical receive station 2 is the same as for FIG. 1 above. It is also configured with a blanket dispersion compensator (1E, 2E) inserted into the optical send station 1 and optical receive station 2 as in FIG. 13.

The WDM signal light sent from the optical send station 1 is amplified in the amplifiers 4 at specific intervals and transmitted through the optical fiber transmission line 3. In sections including a variable dispersion compensator 9, the signal passes through the optical transmission line 5, travels to the variable dispersion compensator 9 and is transmitted through the optical transmission line 5. Afterwards, the signal is once again amplified by the optical amplifiers 4 at specific intervals, transmitted to the optical fiber transmission line 3. The signal travels through the optical transmission line 5, passes through another section including the variable dispersion compensator 9, and after being transmitted through the optical transmission line 5, amplified by the optical amplifiers 4 at specific intervals. Then, the signal is transmitted on to the optical fiber transmission line 3 and received by the optical receive station 2.

When repairing a transmission line having an accumulated wavelength dispersion misalignment, the accumulated dispersion misalignment can be reduced by changing the amount of wavelength dispersion compensation from the variable dispersion compensator 9. The variable dispersion compensator 9 is for offsetting the wavelength dispersion misalignment that occurs. This configuration may be used alone without combining with the configuration of FIG. 13.

Figure 15:
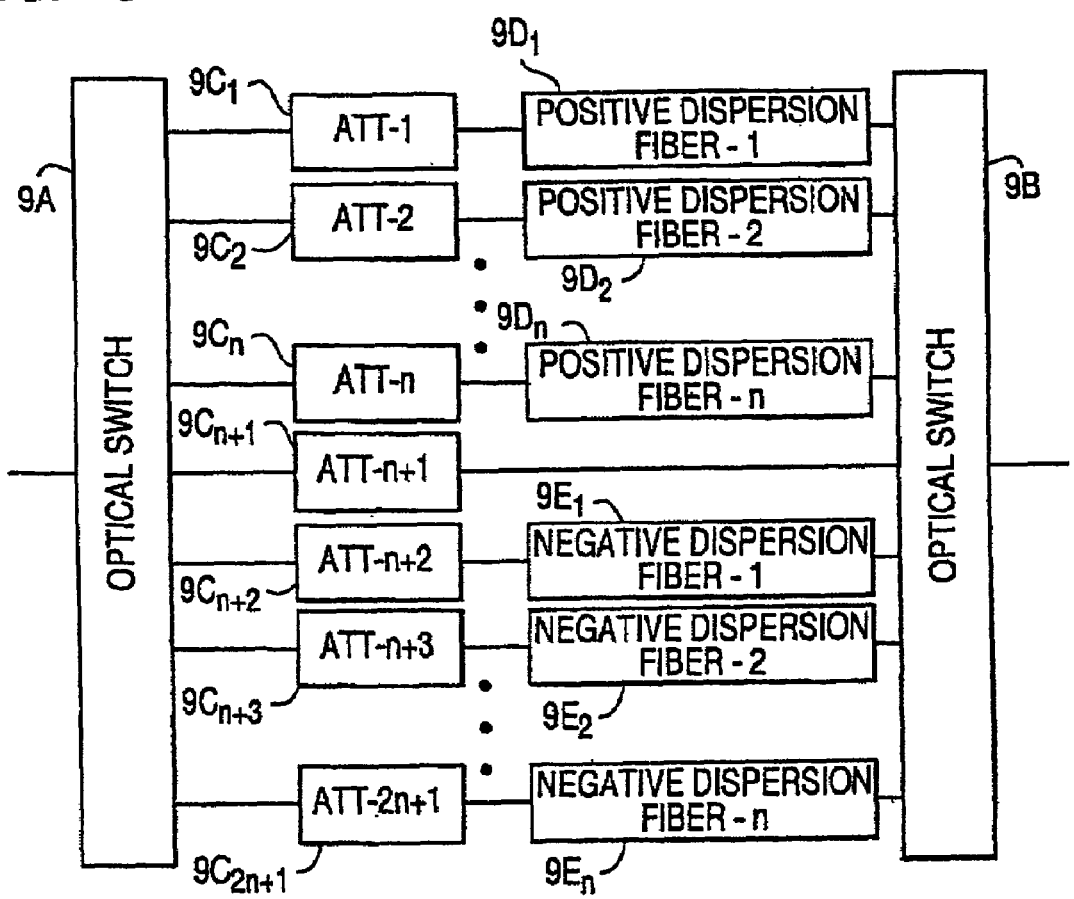
FIG. 15 is a diagram illustrating a configuration of a variable dispersion compensator, according to an embodiment of the present invention, according to an embodiment of the present invention.

FIG. 15 is a diagram illustrating a configuration of a variable dispersion compensator, according to an embodiment of the present invention.

Referring now to FIG. 15, the variable dispersion compensator 9 includes two optical switches 9A and 9B, n positive dispersion fibers 9D, n negative dispersion fibers 9E, and 2n+1 optical attenuators (OPT ATT) 9C.

Several quantities of a positive dispersion fiber 9D and a negative dispersion fiber 9E should be prepared in steps. By using an optical attenuator 9C, the losses at all ports can be adjusted to be equivalent in advance.

A signal light enters the optical switch 9A. When the signal light enters the optical switch 9A, some positive dispersion is generated in relation to the signal light in the port where the positive dispersion fiber 9D has been installed and negative dispersion will be generated in the port where the negative dispersion fiber 9E has been installed. Thus, by selecting the ports of the optical switches 9A and 9B, it is possible to change the amount of dispersion compensation.

After transmission through each port, the signal light once again enters the optical switch 9B and is transmitted through the optical transmission line.

FIGS. 16(A) and 16(B) are diagrams illustrating transmission line repair in a wavelength division multiplexing transmission system, according to an embodiment of the present invention. In FIGS. 16(A) and (B), transmission line repair is not done by replacing only the fiber that has trouble. Instead, transmission line repair replaces all fibers, or all fibers and all optical amplifiers, in the repeater span where the cable repair occurs.

The positive dispersion fiber 3a and the negative dispersion fiber 3b in the repeater span where the cable repair occurs are replaced by the spare positive dispersion fiber 3a' and the spare negative dispersion fiber 3b'. NZ-DSF 5, which has a smaller dispersion absolute value than the positive dispersion fiber and the negative dispersion fiber, is used as the additional fiber, which is inserted for the repair. The positions where NZ-DSF 5 are inserted along the transmission line are not limited to those positions as shown, for example, in FIGS. 16(A) and (B).

Referring now to FIG. 16(A), the WDM signal light is amplified to the required level in an optical amplifier 4. Afterwards, the signal light travels through spare positive dispersion fiber 3a', spare negative dispersion fiber 3b', NZ-DSF 5, and then enters another optical amplifier 4.

Referring now to FIG. 16(B), the WDM signal light is amplified to the required level in an optical amplifier 4. Afterwards, the signal light travels through NZ-DSF 5, spare positive dispersion fiber 3a', spare negative dispersion fiber 3b', another NZ-DSF 5, and then enters another optical amplifier 4.

FIGS. 17(A) and 17(B) are diagrams illustrating transmission line repair in a wavelength division multiplexing transmission system, according to an embodiment of the present invention. In FIGS. 17(A) and (B), transmission line repair is not done by replacing only the fiber that has trouble. Instead, transmission line repair replaces all fibers, or all fibers and all optical amplifiers, in the repeater span where the cable repair occurs.

The positive dispersion fiber 3*a*, the negative dispersion fiber 3*b*, and the optical amplifier 4 in the repeater span where the cable repair occurs are replaced by the spare positive dispersion fiber 3*a*', the spare negative dispersion fiber 3*b*' and the optical amplifier 4'. NZ-DSF 5, which has a smaller dispersion absolute value than the positive dispersion fiber and the negative dispersion fiber, is used as the additional fiber which is inserted for the repair. The positions where NZ-DSF 5 are inserted along the transmission line are not limited to those positions as shown, for example, in FIGS. 17(A) and (B).

Referring now to FIG. 17(A), the WDM signal light travels through NZ-DSF 5 and enters an optical amplifier 4' where it is amplified to the required level. Afterwards, the signal light travels through positive dispersion fiber 3*a*', spare negative dispersion fiber 3*b*' and then, enters another optical amplifier 4'.

Referring now to FIG. 17(B), the WDM signal light travels through NZ-DSF 5 and enters an optical amplifier 4' where it is amplified to the required level. Afterwards, the signal light travels through positive dispersion fiber 3*a*', spare negative dispersion fiber 3*b*' and enters another optical amplifier 4'. Then, the signal light travels through another NZ-DSF 5.

Various examples are described herein where a specific number of channels or wavelengths are used, and specific wavelengths are used. However, the present invention is not limited to these specific number of channels or wavelengths, or these specific wavelengths.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for repairing a transmission line having a section which comprises a first fiber having a positive dispersion with respect to wavelength transmitted through the section in the first half of the transmission line and a second fiber having a negative dispersion with respect to wavelength transmitted through the section in the second half of the transmission line, the method comprising:
inserting a third fiber in the section, wherein the third fiber has an absolute value of dispersion per unit of length smaller than an absolute value of dispersion per unit of length of the first and the second fibers.

2. A method as in claim 1, wherein, before inserting the third fiber, the first and second fibers are adjacent to each other so that light traveling through the section travels through one of the first and second fibers and then through the other of the first and second fibers.

3. A method as in claim 1, wherein the third fiber has first and second ends and, after inserting the third fiber, the first end of the third fiber is adjacent to an end of one of the first and second fibers, and the second end of the third fiber is adjacent to an end of the other of the first and second fibers, so that light traveling through the section travels through one of the first and second fibers, then through the third fiber, and then through the other of the first and second fibers.

4. A method as in claim 2, wherein the third fiber has first and second ends and, after inserting the third fiber, the first end of the third fiber is adjacent to an end of one of the first and second fibers, and the second end of the third fiber is adjacent to an end of the other of the first and second fibers, so that light traveling through the section travels through one of the first and second fibers, then through the third fiber, and then through the other of the first and second fibers.

5. A method as in claim 1, wherein first and second repeaters are disposed along the transmission line, the section being defined as a portion of the transmission line between the first and second repeaters.

6. A method as in claim 2, wherein first and second repeaters are disposed along the transmission line, the section being defined as a portion of the transmission line between the first and second repeaters.

7. A method as in claim 3, wherein first and second repeaters are disposed along the transmission line, the section being defined as a portion of the transmission line between the first and second repeaters.

8. A method as in claim 4, wherein first and second repeaters are disposed along the transmission line, the section being defined as a portion of the transmission line between the first and second repeaters.

9. A method as in claim 1, wherein the section is underwater at a depth of greater than or equal to 1000 meters.

10. A method as in claim 1, wherein the section is underwater at a depth of less than or equal to 1000 meters.

11. A method for repairing a transmission line having a section which comprises a first fiber having a positive dispersion with respect to wavelength transmitted through the section in the first half of the transmission line and a second fiber having a negative dispersion with respect to wavelength transmitted through the section in the second half of the transmission line, a trouble occurring in the first fiber to thereby divide the first fiber into a first portion and a second portion, the method comprising:
inserting a third fiber in the section between the first and second portions to repair the trouble, wherein the third fiber has an absolute value of dispersion per unit of length smaller than the absolute value of dispersion per unit of length of the first fiber and the second fiber.

12. A method as in claim 11, wherein, before inserting the third fiber, the first and second fibers are adjacent to each other so that light traveling through the transmission line travels through one of the first and second fibers and then through the other of the first and second fibers.

13. A method as in claim 11, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the section travels through one of the first and second portions, then through the third fiber, and then through the other of the first and second portions.

14. A method as in claim 12, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the section travels through one of the first and second portions, then through the third fiber, and then through the other of the first and second portions.

15. A method as in claim 11, wherein first and second repeaters are disposed along the transmission line, the section being defined as a portion of the transmission line between the first and second repeaters.

16. A method as in claim 12, wherein first and second repeaters are disposed along the transmission line, the section being defined as a portion of the transmission line between the first and second repeaters.

17. A method as in claim 13, wherein first and second repeaters are disposed along the transmission line, the section being defined as a portion of the transmission line between the first and second repeaters.

18. A method as in claim 14, wherein first and second repeaters are disposed along the transmission line, the section being defined as a portion of the transmission line between the first and second repeaters.

19. A method as in claim 11, wherein the section is underwater at a depth of greater than or equal to 1000 meters.

20. A method for repairing a transmission line having a section which comprises a first fiber having a positive dispersion with respect to wavelength transmitted through the section in the first half of the transmission line and a second fiber having a negative dispersion with respect to wavelength transmitted through the section in the second half of the transmission line, a trouble occurring in the second fiber to thereby divide the second fiber into a first portion and a second portion, the method comprising:

inserting a third fiber in the section between the first and second portions to repair the trouble, wherein the third fiber has an absolute value of dispersion per unit of length smaller than the absolute value of dispersion per unit of length of the first fiber and the second fiber.

21. A method as in claim 20, wherein, before inserting the third fiber, the first and second fibers are adjacent to each other so that light traveling through the section travels through one of the first and second fibers and then through the other of the first and second fibers.

22. A method as in claim 20, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the section travels through one of the first and second portions, then through the third fiber, and then through the other of the first and second portions.

23. A method as in claim 21, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the section travels through one of the first and second portions, then through the third fiber, and then through the other of the first and second portions.

24. A method as in claim 20, wherein first and second repeaters are disposed along the transmission line, the section being defined as a portion of the transmission line between the first and second repeaters.

25. A method as in claim 21, wherein first and second repeaters are disposed along the transmission line, the section being defined as a portion of the transmission line between the first and second repeaters.

26. A method as in claim 22, wherein first and second repeaters are disposed along the transmission line, the section being defined as a portion of the transmission line between the first and second repeaters.

27. A method as in claim 23, wherein first and second repeaters are disposed along the transmission line, the section being defined as a portion of the transmission line between the first and second repeaters.

28. A method as in claim 20, wherein the section is underwater at a depth of greater than or equal to 1000 meters.

29. An optical communication system comprising:

a transmission line having first and second repeaters arranged along the transmission line with no other repeaters between the first and second repeaters, a section of the transmission line being defined as the portion of the transmission line between the first and second repeaters, the section comprising a first fiber having a positive dispersion with respect to wavelength transmitted through the section in the first half of the transmission line and a second fiber having a negative dispersion with respect to wavelength transmitted through the section in the second half of the transmission line, wherein a third section inserted in the section to repair the section has an absolute value of dispersion per unit of length smaller than the absolute value of dispersion per unit of length of the first and the second fibers.

30. An optical communication system as in claim 29, wherein the third fiber is inserted between the first and second fibers.

31. An optical communication system as in claim 29, wherein, before inserting the third fiber, the first and second fibers are adjacent to each other so that light traveling through the section travels through one of the first and second fibers and then through the other of the first and second fibers.

32. An optical communication system as in claim 30, wherein, before inserting the third fiber, the first and second fibers are adjacent to each other so that light traveling through the section travels through one of the first and second fibers and then through the other of the first and second fibers.

33. An optical communication system as in claim 29, wherein the third fiber has first and second ends and, after inserting the third fiber, the first end of the third fiber is adjacent to an end of one of the first and second fibers, and the second end of the third fiber is adjacent to an end of the other of the first and second fibers, so that light traveling through the section travels through one of the first and second fibers, then through the third fiber, and then through the other of the first and second fibers.

34. An optical communication system as in claim 30, wherein the third fiber has first and second ends and, after inserting the third fiber, the first end of the third fiber is adjacent to an end of one of the first and second fibers, and the second end of the third fiber is adjacent to an end of the other of the first and second fibers, so that light traveling through the section travels through one of the first and second fibers, then through the third fiber, and then through the other of the first and second fibers.

35. An optical communication system as in claim 29, wherein a trouble in the first fiber divided the first fiber into a first portion and a second portion, the third fiber being inserted between the first and second portions to repair the trouble.

36. An optical communication system as in claim 35, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the section travels through one of the first and second portions, then through the third fiber, and then through the other of the first and second portions.

37. An optical communication system as in claim 29, wherein a trouble in the second fiber divided the second fiber into a first portion and a second portion, the third fiber being inserted between the first and second portions to repair the trouble.

38. An optical communication system as in claim 37, wherein the third fiber has first and second ends and, after inserting the third fiber, the first end of the third fiber is adjacent to an end of one of the first and second portions, and the second end of the third fiber is adjacent to an end of the other of the first and second portions, so that light traveling through the transmission line travels through one of the first and second portions, then through the third fiber, and then through the other of the first and second portions.

39. An optical communication system as in claim 29, wherein the section is underwater at a depth of greater than or equal to 1000 meters.

40. An optical communication system as in claim 29, wherein the section is underwater at a depth of less than or equal to 1000 meters.

41. An optical communication system as in claim 37, wherein the section is underwater at a depth of greater than or equal to 1000 meters.

42. An optical communication system comprising:
a transmission line having first and second ends and a plurality of sections between the first and second ends so that light travels from the first end, through each of the sections, and then to the second end, wherein
at least some sections of the plurality of sections each comprise a first fiber having a positive dispersion with respect to wavelength transmitted through the section in the first half of the transmission line and a second fiber having a negative dispersion with respect to wavelength transmitted through the section in the second half of the transmission line,
a respective section of the plurality of sections, and not being a section of said at least some sections, being formed of an optical fiber having an absolute value of dispersion per unit of length smaller than the absolute value of dispersion per unit of length of the first and the second fibers, said respective section having, arranged along the section, at least one of the group consisting of:
a device for splitting light traveling through the section,
a device for inserting light into the section, a gain equalizer, and
a dispersion compensator.

43. An optical communication system as in claim 42, wherein the optical fiber forming said respective section of the plurality of sections, which is not a section of said at least some sections, is non-zero dispersion shifted fiber (NZ-DSF).

44. An optical communication system as in claim 42, further comprising:
plurality of repeaters arranged along the transmission line, said plurality of sections being defined by the positioning of the repeaters so that a respective section is defined as a portion of the transmission line between repeaters without any other repeaters therebetween.

45. An optical communication system as in claim 43, further comprising:
a plurality of repeaters arranged along the transmission line, said plurality of sections being defined by the positioning of the repeaters so that a respective section is defined as a portion of the transmission line between repeaters without any other repeaters therebetween.

46. An optical communication system comprising:
a section of a transmission line having repeaters arranged along the transmission line, the section comprising a first fiber having a positive dispersion with respect to wavelength transmitted through the section in the first half of the transmission line, a second fiber having a negative dispersion with respect to wavelength transmitted through the section in the second half of the transmission line, and at least one fiber other than the first and second fiber, having an absolute value of dispersion per unit of length smaller than the absolute value of dispersion per unit of length of the first and second fibers.

47. An optical communication system comprising:
a transmission line having a first section and a second section divided by repeaters arranged along the transmission line, wherein
the first section comprises a first fiber having a positive dispersion with respect to wavelength transmitted through the section in the first half of the transmission line and a second fiber having a negative dispersion with respect to wavelength transmitted through the section in the second half of the transmission line, and
the second section comprises a fiber other than the first and second fiber, the fiber having an absolute value of dispersion per unit of length smaller than the absolute value of dispersion per unit of length of the first and second fibers.

48. An optical communication system as in claim 47, wherein the second section is between a terminal and a respective repeater of said repeaters, with no other repeater between the terminal and said respective repeater.

49. An optical communication system as in claim 47, wherein the second section is underwater at a depth of less than or equal to 1000 meters.

* * * * *

UNITED STATES PATENT AND TRADEMARK OFFICE
CERTIFICATE OF CORRECTION

PATENT NO. : 7,164,864 B2
APPLICATION NO. : 09/783527
DATED : January 16, 2007
INVENTOR(S) : Toshiki Tanaka et al.

Page 1 of 1

It is certified that error appears in the above-identified patent and that said Letters Patent is hereby corrected as shown below:

Title Page, Column 2 (Other Publication), Line 9, change "September 16, 199," to --September 16, 1999,--.

Title Page, Column 2 (Other Publications), Line 13, change "(5+20Gbit/s)" to --(5x320Gbit/s)--.

Column 20, Line 3, insert --a-- before "plurality".

Signed and Sealed this

Twenty-sixth Day of February, 2008

JON W. DUDAS
*Director of the United States Patent and Trademark Office*